May 24, 1927.

W. C. KERWIN

MANIFOLD 1,629,796

Filed Aug. 25, 1926

Inventor
W.C. KERWIN

By G.W. Earnshaw
Attorney

Patented May 24, 1927.

1,629,796

UNITED STATES PATENT OFFICE.

WILLIAM C. KERWIN, OF JOPLIN, MISSOURI.

MANIFOLD.

Application filed August 25, 1926. Serial No. 131,498.

This invention relates to heating or cooling apparatus and more particularly to a manifold for selectively directing the course of a heating or cooling fluid to be circulated therethrough according to the purpose for which the device is to be put.

The principal object of this invention is to provide a particularly advantageous arrangement of parts whereby a heating or cooling fluid may be directed selectively through the device along one of several courses according to the position of the device or the purpose for which it is to be put.

Figure 1:
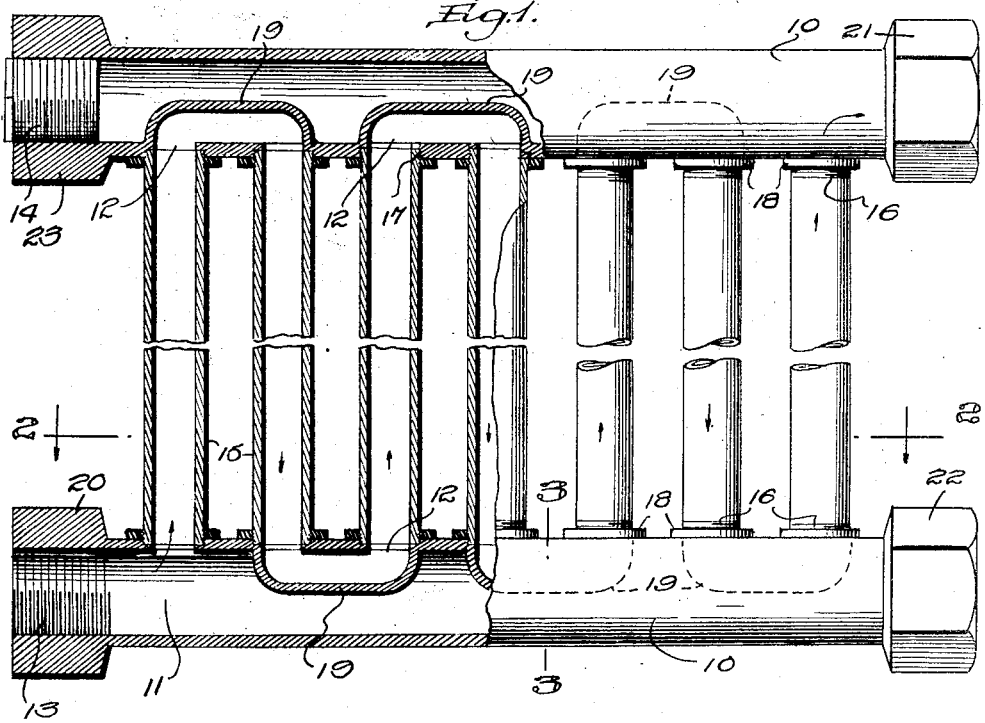
Figure 2:
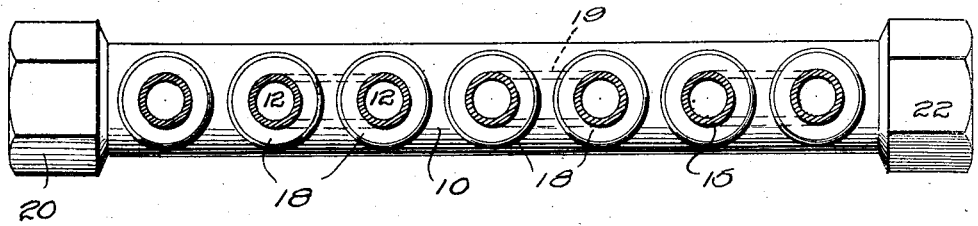
Figure 3:
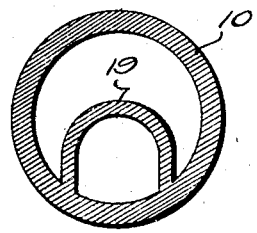

In the drawing I have illustrated a preferred embodiment of my invention. In the drawing, Figure 1 is a side view, partly in elevation and partly in section, Figure 2 is a section on line 2—2 of Figure 1, and Figure 3 is a section on line 3—3 of Figure 1.

In this showing, reference numeral 10 indicates a pair of spaced elongated headers having openings 11 in each end thereof and provided with alined spaced openings 12 in the wall or body portion thereof. The end openings 11 are threaded as at 13 to receive closure members such as plugs 14 for the purpose hereinafter to be described. Secured within the similarly arranged openings 12 are pipes 15. These pipes may be secured in the openings 12 in any suitable manner as by providing the ends of the pipes 15 with external threads 16 and the openings 12 with internal threads as at 17 and threading the pipes 15 into such threaded openings. In order to provide against leakage at the point of connection of the pipes 15 in the openings 12 in the header 10 internally threaded flange members 18 may be threaded on the ends of the pipes 15 and turned up against the headers 10. In order to provide means of communication between pairs of adjacent pipes 15 through the openings 12, I provide partition or wall members 19 preferably formed inwardly of and integral with the headers 10. By so providing these wall members 19, I avoid the use of separate L's or angle members which are inconvenient to assemble and are more expensive.

As will be seen from the drawing there is but one communicating opening between the series of pipes 15 and the interior of each header, and the communicating opening between the pipes and one header is at the opposite end from the communicating opening between the pipes and the other header. In other words, I provide an odd number of spaced openings 12 and pipes 15 and connect only the outer or most distant pipes with the interior of the headers so that a continuous flow is provided from one end of one header through the pipes to the opposite end of the other header. In this manner I provide for a predesigned positive continuous flow through the pipes in one direction or the other.

As stated above, each header is provided with openings at each end thereof in order that either end opening or either header may serve as a fluid inlet opening. When either end opening of either of the headers has been selected as an inlet opening either end opening of the other of the headers may serve as an outlet opening and plugs 14 are inserted in the two openings which have not been selected as inlet and outlet openings. For example, the opening in the end 20 of the lower header may be selected as an inlet opening and the opening in the end 21 of the upper header may be selected as an outlet opening and plugs inserted in the openings in the ends 22 and 23 with the result that the liquid introduced into the device will follow a course as indicated by the arrows in Figure 1. However, for some purposes it may be desirable to introduce the fluid through the opening in the end 22 in which case a plug would be inserted in the end 20 and the fluid so introduced at the end 22 would pass along the header and enter the opening 12 and pipe 15 at a point most remote from the opening in the end 22 and would pass through the pipes and the interior of the partition members 19 in a manner described above and flow into the upper header through the pipe 15 and opening 12 most remote from its point of entrance into the series of pipes 15 from which point the fluid may be directed either out of the opening in the end 21 or the end 23.

One of the principal advantages of this novel arrangement of parts is that my device may be used as a radiator in an ordinarily inconvenient position since I may employ any end opening as an inlet opening with the result that the heating pipes conducting the fluid to the radiator may be connected to it at the most convenient point, and the outlet pipe may also be connected at the most convenient point. This is particularly advantageous in that such an arrangement will often avoid cutting through walls or floors at an inconvenient point or the necessity of providing unnecessary joints and connections.

It will be apparent that I provide a simple device which is suitable for heating or cooling purposes, which is of simple and inexpensive construction in which either selected end may be of a higher temperature than the other, in which the direction of fluid flow may readily be reversed to minimize the formation of scale or for other purpose, and in which I have obviated the use of L's and like connections.

It is to be understood that the form of my invention herewith shown and described is to be taken as a preferred example of the same and that various changes in the shape, size, and arrangement of parts may be resorted to without departing from the spirit of the invention or the scope of the subjoined claims.

I claim:

1. A device of the character described comprising a pair of spaced headers provided with openings at the ends thereof adapted to receive closure members whereby a selected pair of the said openings may be closed, each of said headers being also provided with spaced openings in the wall thereof, means communicating with the headers for conducting fluid in a circuitous path back and forth from one header to the other, said fluid conducting means comprising spaced pipes whose ends are secured within the said spaced openings in said headers, means provided within each header to prevent the discharge of fluid from the fluid conducting means into said headers except at the ends of said fluid conducting means whereby upon the closure of either of the two end openings in each header fluid may be admitted at either of the two remaining end openings and discharged from the other of said remaining end opening after passing through the entire length of the said circuitous fluid conducting means, substantially as described.

2. A device of the character described comprising a pair of spaced headers provided with openings at the ends thereof adapted to receive closures whereby a selected pair of the said openings may be closed, each of said headers being also provided with a plurality of, but odd numbered, spaced openings, an odd number of pipes extending from one header to the other and having their ends secured within the said spaced openings, one end of one of the two outer or most distant pipes being in communication with the interior of one of the headers and the opposite end of the other of the two outer or most distant pipes being in communication with the interior of the other header and partitions within the headers and forming with the adjacent side of the header means of communication between the ends of alternate adjacent pairs of pipes and forming therewith a circuitous fluid conducting path from one end of one of said headers to the opposite end of the other of said headers, substantially as described.

In testimony whereof I affix my signature.

WILLIAM C. KERWIN.